United States Patent [19]
Ray et al.

[11] Patent Number: 5,281,246
[45] Date of Patent: Jan. 25, 1994

[54] AIR CLEANER ASSEMBLY

[75] Inventors: Shaun Ray; Robert G. Nelson, both of Wichita, Kans.

[73] Assignee: Metal-Fab, Inc., Wichita, Kans.

[21] Appl. No.: 996,014

[22] Filed: Dec. 23, 1992

[51] Int. Cl.$^5$ .................... B01D 46/00; B01D 46/40
[52] U.S. Cl. ...................................... 55/302; 55/320; 55/337; 55/356; 55/429; 55/472
[58] Field of Search ................. 55/302, 320, 337, 356, 55/385.2, 429, 467, 472

[56] References Cited

U.S. PATENT DOCUMENTS

| | | | |
|---|---|---|---|
| 3,818,817 | 6/1974 | Nederman | 98/115 |
| 4,158,462 | 6/1979 | Coral | 285/184 |
| 4,163,650 | 8/1979 | Watson et al. | 55/356 X |
| 4,718,924 | 1/1988 | DeMarco | 55/302 |
| 4,802,983 | 2/1989 | Howeth | 55/302 |
| 4,860,644 | 8/1989 | Kohl et al. | 98/115.4 |
| 4,868,948 | 9/1989 | Arnold | 55/302 X |
| 4,957,520 | 9/1990 | Parmentier et al. | 55/337 X |
| 5,097,750 | 3/1992 | Oldham et al. | 55/467 X |
| 5,147,427 | 9/1992 | Abbot et al. | 55/302 |

OTHER PUBLICATIONS

Kemper "Always a Clean Solution", one page.
Nederman "Pivoting Arm", four pages.

*Primary Examiner*—Charles Hart
*Attorney, Agent, or Firm*—Bill D. McCarthy; Louis W. Watson

[57] ABSTRACT

An air cleaner assembly for capturing and filtering fumes is provided which comprises a housing having an inlet and an outlet, a pair of filter cartridges supported therein and a blower. A channel and baffle assembly direct the flow of air drawn into the housing in a vortical pattern around the filter cartridges to separate heavier particles in the air and to efficiently draw the air through the filter cartridges. The separated particles collect in a pair of dust trays that are provided with flow directional lips to prevent the vortical air flow from disturbing the deposited particles. A backflushing assembly cleans the filter cartridges of the particles that are collected thereon by pulsing the particles away with a blast of air directed through the entire length of the filter cartridges.

24 Claims, 4 Drawing Sheets

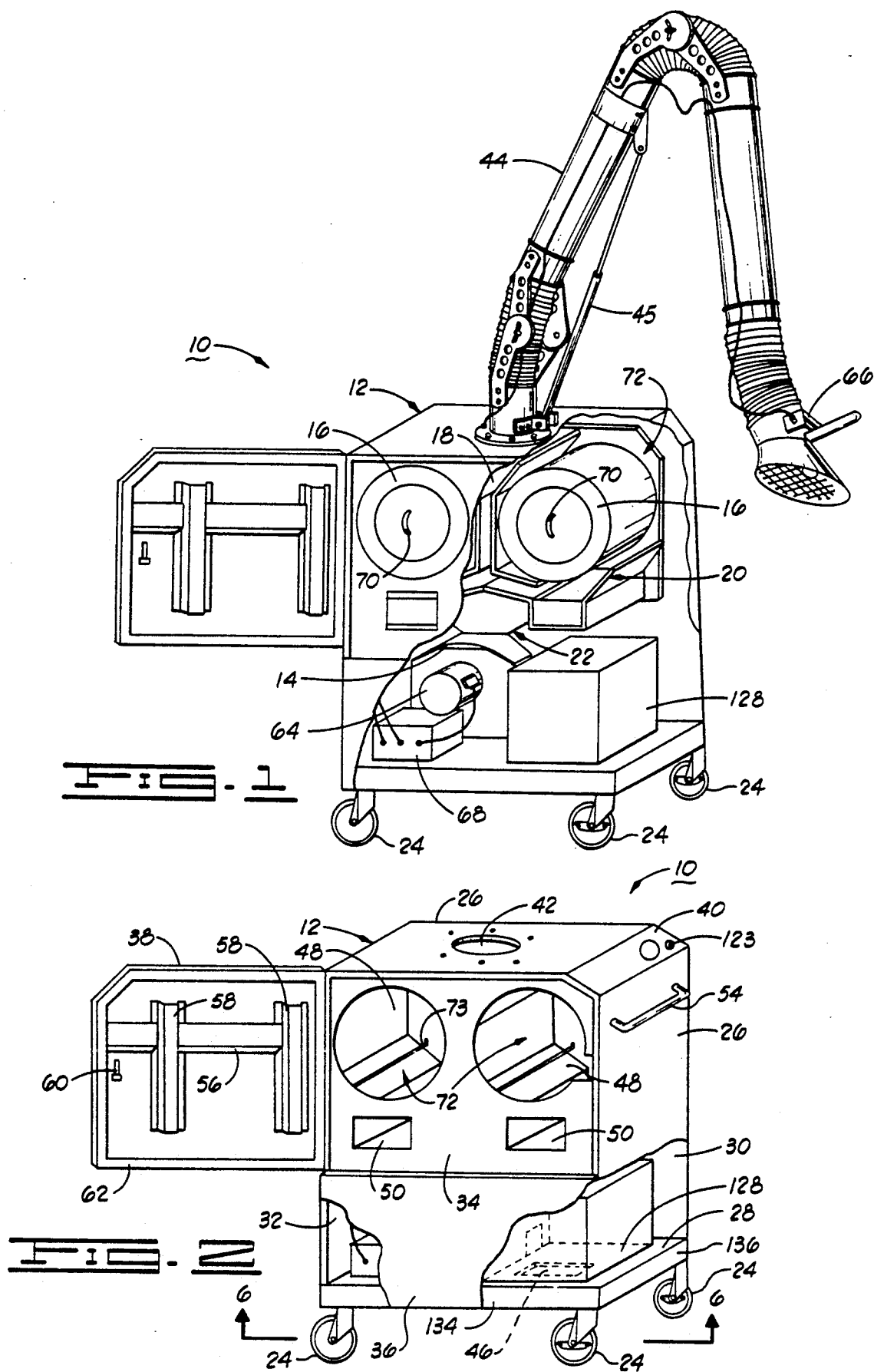

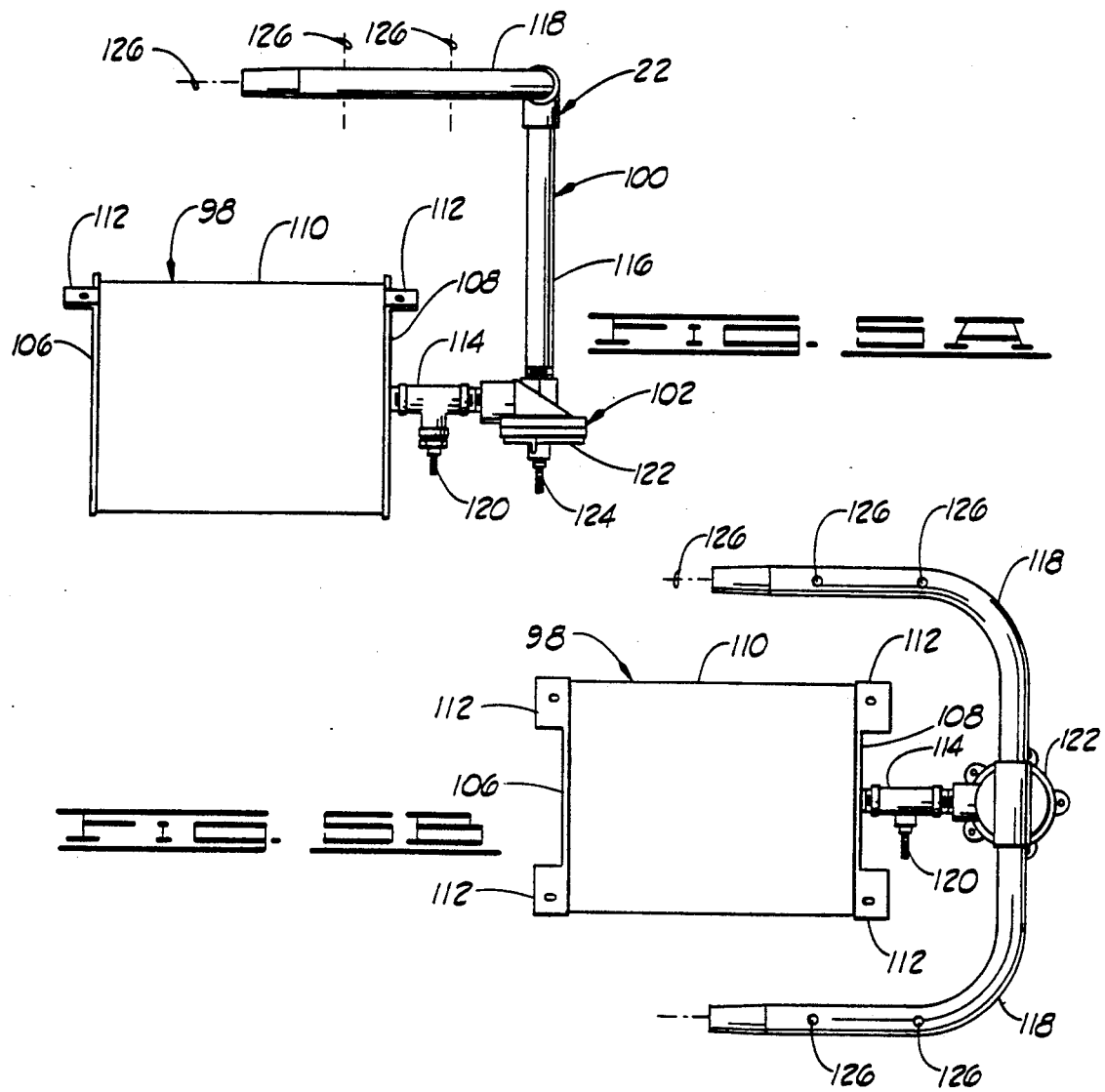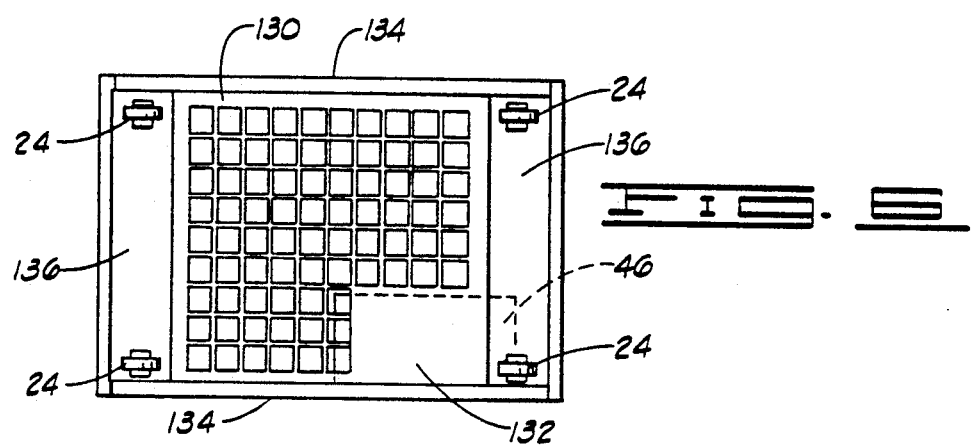

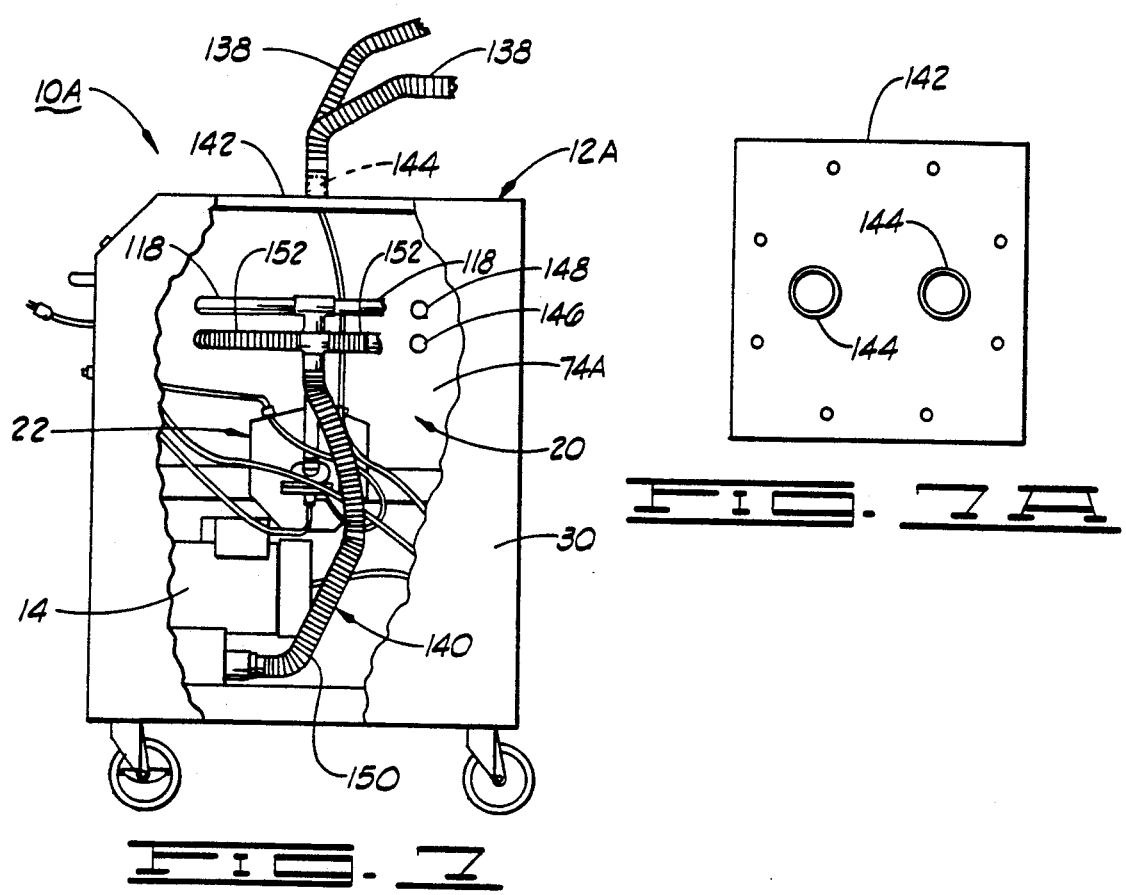
FIG. 7
FIG. 7A
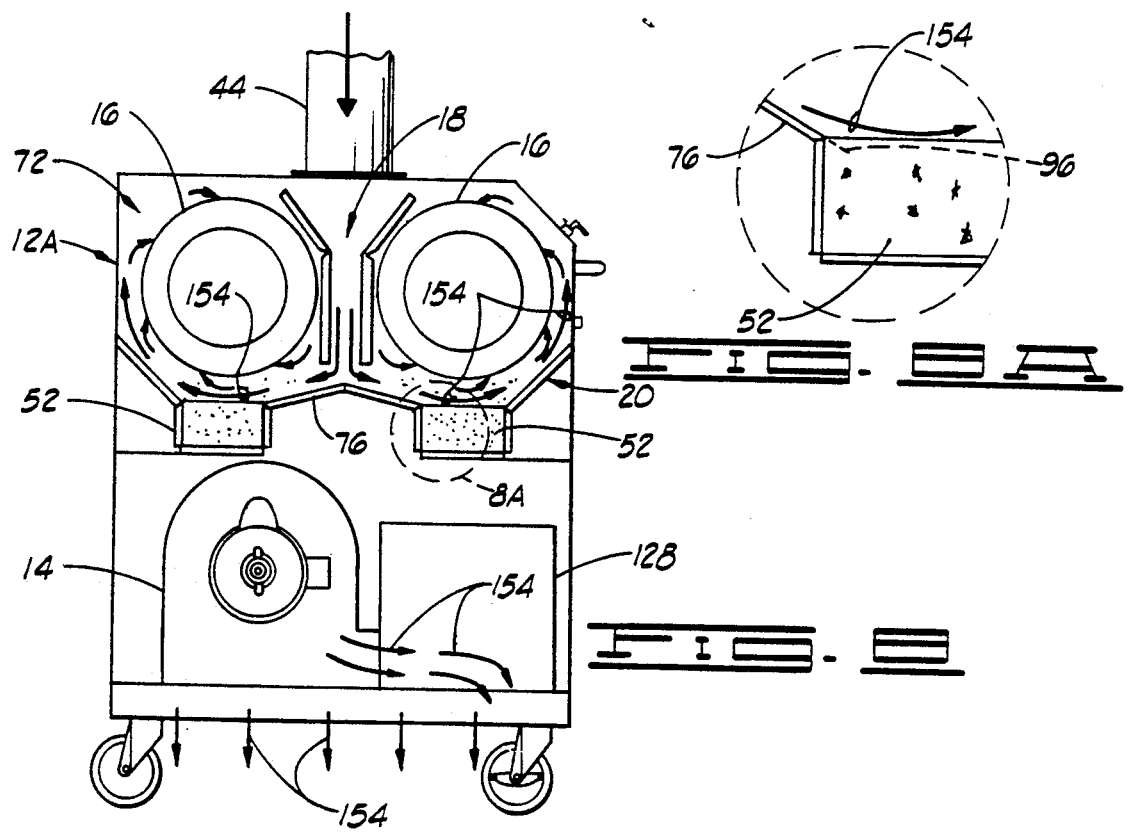
FIG. 8
FIG. 8A

AIR CLEANER ASSEMBLY

BACKGROUND OF THE INVENTION

1. Field of the Invention

The present invention relates to an apparatus for filtering particles from gaseous fumes, and more particularly, but not by way of limitation, to an improved air cleaner assembly for capturing and filtering gaseous fumes at their source.

2. Discussion of Related Art

In the past, it was common to use large exhaust hoods or fans to remove indoor industrial pollutants, such as welding smoke, grinding dust and other gaseous fumes. In recent years, however, it has become more common to remove these pollutants with localized exhaust fans or blowers provided with maneuverable capture arms or with fixed and portable air cleaners.

Focusing on the latter, air cleaners typically include a housing, a blower and an air filter. The blower draws the fumes into the housing and through the filter where the suspended particles are collected. The blower then exhausts the filtered air from the housing. Often a receptacle or dust tray is provided in which heavier particles, such as sparks, are collected. It is also common to provide an air cleaner with a backflushing system with which to clean the filter after an extended period of use. The particles removed from the filter by the backflushing system are collected in the dust tray and subsequently disposed of along with the heavier particles previously collected.

While several prior art air cleaning devices have met with some success, problems have nevertheless been encountered with the use of such devices. For example, as a result of the configuration and positioning of the dust trays, heavier particles are not effectively collected in the dust tray, thereby resulting in such particles being collected in the filter and in turn shortening the life of the filter. Further, backflushing systems employed in prior art devices do not efficiently flush the particles from the filter; that is, typical backflushing systems flush only a small portion of the filter. An additional problem with prior art devices is that the particles that are flushed from the filter are sucked back into the filter once the filtering process is resumed, thus requiring that the dust trays be removed and emptied after each cleaning.

Therefore, it has long been recognized that a need exists for an improved air cleaner assembly which operates more efficiently and which overcomes the deficiencies of prior art air cleaners. It is to such an improved air cleaner assembly that the present invention is directed.

SUMMARY OF THE INVENTION

According to the present invention, an air cleaner assembly for capturing and filtering fumes at their source of origin is provided. Broadly, the air cleaner assembly includes a housing having an inlet port and an outlet port, a pair of filter cartridges supported in the housing and a blower mounted in the housing. A venturi channel is provided for decreasing the velocity of the air flow, and a baffle assembly is disposed about the filter cartridges for directing the flow of air in a vortical pattern around the filter cartridges so that heavier particles are caused to be separated from the high velocity air and the air is caused to be more efficiently drawn through the filter cartridges. An adjustable capture arm or a flexible hose is attached to the housing over the inlet port to provide a conduit through which fumes can be transported from their source into the housing of the air cleaner assembly.

The air cleaner assembly further includes a backflushing assembly which extends into the filter cartridges and effectively pulses away the particles that have collected on the filter cartridges. The heavy particles separated from the high velocity air and the particles pulsed from the filter cartridges are deposited in dust trays that are provided with a pair of flow directional lips which prevent the flow of air above the dust trays from disturbing the particles deposited therein.

An object of the present invention is to provide an improved air cleaner assembly for capturing and filtering gaseous fumes at their source.

Another object of the present invention, while achieving the above stated object, is to provide an improved air cleaner assembly which more effectively separates heavy particles from the air flow and which allows for better cleaning efficiency and longer filter life.

Yet another object of the present invention, while achieving the above stated objects, is to provide an improved air cleaner assembly which employs an effective backflushing assembly and dust trays which prevent the flushed particles from being pulled back into the filters after flushing them therefrom.

Another object of the present invention, while achieving the above stated objects, is to provide an improved air cleaner assembly which is quiet in operation, economical to manufacture and durable in construction.

Other objects, advantages and features of the present invention will be apparent to those skilled in the art from the following detailed description when read in conjunction with the drawings and the appended claims.

BRIEF DESCRIPTION OF DRAWINGS

FIG. 1 is a partially cutaway, perspective view of an air cleaner assembly constructed in accordance with the present invention.

FIG. 2 is a partially cutaway, perspective view of the air cleaner assembly of FIG. 1 less the capture arm, filter cartridges and dust trays.

FIG. 5A is a side elevational view of the backflushing assembly. FIG. 5B is a top plan view of the backflushing assembly.

FIG. 6 is a cross section taken at 6—6 in FIG. 2 illustrating the exhaust grill.

FIG. 7 is a partially cutaway, back elevational view of another embodiment of an air cleaner assembly constructed in accordance with the present invention. FIG. 7A is a top plan view of the intake plate employed with the air cleaner assembly of FIG. 7.

FIG. 8 is a partially detailed, semi-diagrammatical view of the air cleaner assembly showing the air flow pattern therethrough. FIG. 8A is an enlargement of encircled area 8A in FIG. 8.

DETAILED DESCRIPTION

Figures 3A, 3B:
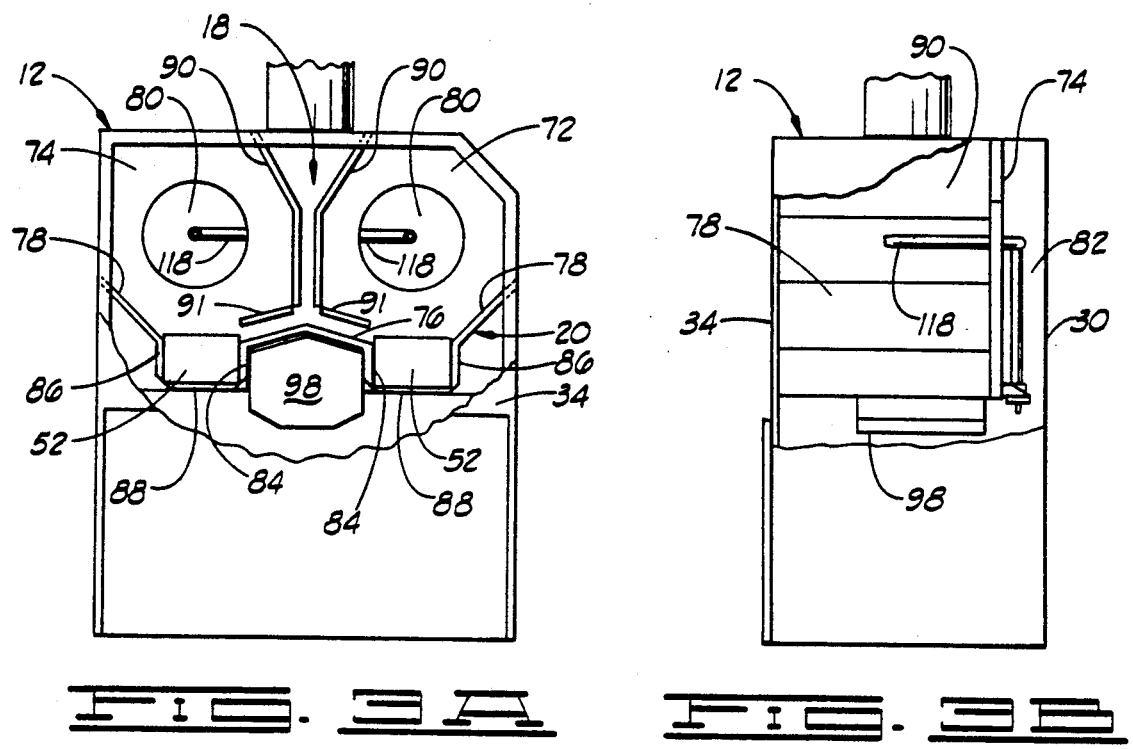
FIG. 3A is a partially cutaway, front elevational view of the housing of the air cleaner assembly.
FIG. 3B is a partially cutaway, side elevational view of the housing of the air cleaner assembly.

Referring now to the drawings, and more particularly to FIGS. 1 and 2, an air cleaner assembly 10 constructed in accordance with the present invention is illustrated. The air cleaner assembly 10 (as shown in FIG. 1) includes a housing 12, a blower 14, a pair of filter cartridges 16, a channel 18, a baffle assembly 20 and a backflushing assembly 22. As more clearly shown in FIG. 2, the housing 12 is supported on a plurality of caster wheels 24 and has a top panel 26, a bottom panel 28, a back panel 30, a side panel 32, an upper front panel 34, a lower front panel 36 and a filter door 38, all of which cooperate to form a cavity when fastened together. The housing 12 is preferably constructed of galvaneal steel or similar material and fastened together with a combination of welds and screws.

The top panel 26 of the housing 12 (best shown in FIG. 2) is preferably constructed as a single panel which extends across the top of the housing 12 and down one side thereof with an angled control panel portion 40 formed therebetween. The top panel 26 is provided with an inlet port 42 to which an adjustable capture arm assembly 44 is attached (as illustrated in FIG. 1). The capture arm assembly 44 provides a conduit through which gaseous fumes can be drawn from their source into the housing 12 of the air cleaner assembly 10. The capture arm assembly 44 can be of any convenient construction, such as that described in U.S. patent application Ser. No. 08/026,521, entitled "Adjustable Exhauster Arm Assembly", by Shaun Ray, filed concurrently herewith and incorporated herein by reference. A gas spring 45 of conventional construction is connected to the housing 12 in the manner denoted and to a median location of the capture arm assembly 44, the gas spring 45 serves to support the capture arm assembly 44 at any desirable angular disposition relative to the housing 12.

The bottom of the housing 12 is provided with an outlet port 46 (shown in phantom in FIG. 2) through which the filtered air is exhausted from the air cleaner assembly 10. The upper front panel 34 is provided with a pair of filter openings 48 and a pair of dust tray openings 50; each such opening 48, 50 is dimensioned to receive one of the filter cartridges 16 or a dust tray 52 (each described hereinbelow), respectively. A handle 54 is attached to the housing 12 for maneuvering the air cleaner assembly 10 on the caster wheels 24.

The filter door 38, illustrated in an opened position in FIGS. 1 and 2, operates in conjunction with the upper front panel 34 to allow access to the filter cartridges 16 and the dust trays 52 and to secure each in position. The filter door 38 is hinged and has a brace 56 and a pair of filter stops 58 which permit the filter door to be secured tightly against the filter cartridges 16 and the dust trays 52 to hold each securely in place. The filter door 38 is further provided with a latch member 60 and a foam seal 62 around its inner edge.

Referring more specifically to FIG. 1, the blower 14, which is conventional in design, is mounted to the bottom panel 28 of the housing 12 with a mounting plate (not shown). The blower 14 is powered by a motor 64 which is electrically energized by a power source (also not shown) in a conventional manner. The motor 64 is electrically connected to a switch 66 which is preferably mounted on the end of the capture arm 44, as illustrated in FIG. 1. A power box 68 is mounted to the bottom panel 28 of the housing 12 to house conventional electrical components (e.g., transformers and relays).

The blower 14 draws air through the capture arm 44 into the housing 12 where the air is then drawn through the filter cartridges 16. The filter cartridges 16 are standard replaceable air filter cartridges which are provided with a finger grip 70 for easy removal. The filter cartridges 16 are horizontally disposed in a spaced apart, parallel relationship within filter compartments 72 defined by the upper front panel 34, side panel 32, the top panel 26 and the baffle assembly 20. Each filter cartridge 16 is supported therein with a pair of filter support rods 73 (only one support rod of each pair is shown in FIG. 2) secured in a parallel relationship across the filter compartments 72. The baffle assembly 20 directs the flow of air in a vortical pattern about the filter cartridges 16 so as to cause the heavier particles, such as sparks, to be effectively separated from the flow of air and to be directed away from the filter cartridges 16, so that the particles are prevented from contacting and possibly damaging the filter cartridges 16. The result is longer filter life and the more efficient passage of air through the filter cartridges 16.

Referring now to FIGS. 3A and 3B, the baffle assembly 20 includes a dividing plate 74, a center baffle 76, and side baffles 78. The dividing plate 74 is a flat plate member which is dimensioned to conform to the upper half of the housing 12 so that an air tight seal can be formed between the edge of the dividing plate 74 and the housing 12. The dividing plate 74 is provided with a pair of air flow openings 80 having a diameter equal to the inner diameter of the filter cartridges 16 so that the open end of the filter cartridges 16 sealingly abut the dividing plate 74 about the air flow openings 80, while permitting the filtered air to flow from the filter compartments 72 via the air flow openings 80. The air flow openings 80 are concentrically aligned with the filter openings 48 of the upper front panel 34 when the dividing plate 74 and the upper front panel 34 are each secured in position. As shown in FIG. 3B, the dividing plate 74 is secured in the housing 12 such that an air flow channel or conduit space 82 is provided between the dividing plate 74 and the back panel 30 of the housing 12, thus providing fluid communication between the filter cartridges 16 and the blower 14.

The center baffle 76 and the side baffles 78 are preferably constructed of a galvaneal steel and are dimensioned to be secured to the dividing plate 74 at one end and to the upper front panel 34 at the other end; the side baffles 78 are further secured to the side panel 32 and the top panel 26. As shown in FIG. 3A, the center baffle 76 is bent down at approximately 30° with respect to horizontal on each side of its center axis. The side baffles 78 are bent up at approximately 45° with respect to horizontal. The center baffle 76 and the side baffles 78 are further configured to be secured together so as to cooperatively receive and support a dust tray 52 below each filter cartridge 16. That is, the center baffle 76 is configured to have a side wall 84 extending down on each side thereof, and the side baffles 78 are each configured to have an oppositely disposed side wall 86, as well as a bottom portion 88, which when the center baffle 76 and the side baffles 78 are attached to one another cooperate to form a pair of slots in which the dust trays 52 are positioned. The center baffle 76 and the side baffles 78, as well as the dividing plate 74, are secured to the housing 12 by providing the baffles 76, 78 and the dividing plate 74 with tabbed edges which facilitate the welding of the baffles 76, 78 and the dividing plate 74 to the housing 12. A sealant such as caulking is applied to all seams within the filter compartments 72 to provide a substantially air tight cavity.

To enhance the separation of heavier particles from the flow of air drawn into the filter compartments 72 and to assist in directing the flow of air about the filter cartridges 16 in a vortical pattern, the channel 18 is formed between the filter compartments 72 below the inlet port 42 and above the center axis of the center baffle 76. The channel 18 is formed by a pair of intake baffles 90 configured to define a Y-shaped channel as shown, or as well, the intake baffles 90 can be curved. The channel 18 is dimensioned so as to have a larger cross sectional area of passage than the inlet port 42 so that the air velocity therethrough will be caused to be reduced.

The intake baffles 90 funnel the flow of air passing through the inlet port 42 against the center baffle 76 at a high velocity. The abrupt change in the direction of the air flow caused by the high velocity air hitting the center baffle 76 results in the heavier particles separating from the air flow and subsequently settling into the dust trays 52. Like the baffles 76, 78, the intake baffles 90 are secured to the dividing plate 74 at one end and to the upper front panel 34 at the other end. A pair of intake baffle extensions 91 is attached to the bottom ends of the intake baffles 90 to further assist in directing the flow of air about the filter cartridges 16, so that the heavier particles are separated from the flow of air and directed away from the filter cartridges 16. Such particles are thus prevented from contacting and possibly damaging the filter cartridges. The intake baffle extensions 91 angularly extend from the ends of the intake baffles 90 parallel to the angular portions of the center baffle 76.

Figure 4:
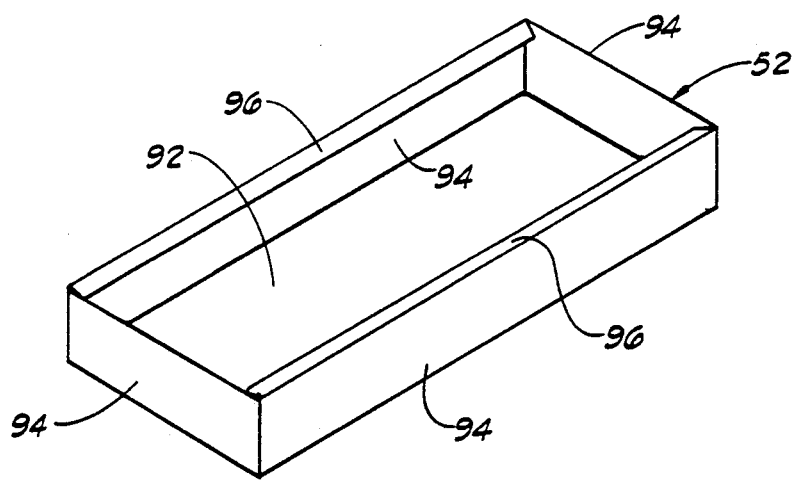
FIG. 4 is a perspective view of a dust tray employed in the present invention.

As illustrated in FIG. 4, the dust trays 52 are characterized as open rectangular shaped receptacles having a flat bottom 92 and four side walls 94. To prevent the particles which collect in the dust trays 52 from being blown or pulled out by the flow of air above the dust trays 52, each dust tray 52 is additionally provided with a pair of flow directional lips 96 which are oppositely formed on the side walls 94 of the dust tray 52; the lengths of the flow directional lips 96 extend tangentially to the air flow direction. The flow directional lips 96, which aerodynamically direct the vortical flow of air away from the interior of the dust trays 52, are inwardly angled approximately 30° from the top of the side walls 94 and extend along the length thereof. As previously stated, the dust trays 52, as well as the filter cartridges 16, are selectively removable from beneath the filter compartments 72 via the dust tray openings 50 and the filter openings 48 disposed in the upper front panel 34.

To periodically clean the filter cartridges 16, the air cleaner assembly 10 is provided with the backflushing assembly 22. The backflushing assembly 22, best illustrated in FIGS. 5A and 5B, produces a blast of air throughout the inside of each filter cartridge 16 which pulses the particles collected thereon away from the filter cartridge 16. The removed particles then settle into the dust trays 52 where they can be disposed of when desired. The flow directional lips 96 on the dust trays 52 provide the advantage of not necessitating that the dust trays 52 be emptied after each use of the backflushing assembly 22 since, as described above, the flow directional lips 96 aerodynamically direct the flow of air away from the interior of the dust trays 52, thereby leaving the contents collected therein undisturbed.

The backflushing assembly 22 comprises an accumulator 98, a blow pipe assembly 100 and a valve assembly 102. The accumulator 98 is a cylindrical tank assembly which is adapted to be secured to the underneath side of the central baffle 76, as illustrated in FIGS. 3A and 3B. That is, the accumulator 98 includes a front end plate 106 and a rear end plate 108 which are welded on either end of a tubular portion 110. The front and rear end plates 106, 108 are each provided with a plurality of tab portions 112 which allow the accumulator 98 to be bolted or fastened in some other suitable fashion to the underneath side of the central baffle 76.

The blow pipe assembly 100 includes a series of tubes extending from the accumulator 98 into the filter cartridges 16 via the air flow opening 80 of the dividing plate 74. That is, the blow pipe assembly 100 includes a connection tube 114, an intermediate tube 116 and a pair of air discharging tubes 118. The connection tube 114 is attached to the accumulator 98 so as to be in fluid communication therewith and is provided with a nipple member 120 which is attachable to an air supply (not shown). The air supply is compressed air preferably in the pressure range of 60 psi to 100 psi.

To control the discharge of air through the blow pipe assembly 100, the valve assembly 102 is connected between the connection tube 114 and the intermediate tube 116. A diaphragm valve 122 which is actuated by a pushbutton air valve 123 mounted on the control panel portion 40 of the housing 12 and operatively connected to the valve 122 via a nipple member 124.

The intermediate tube 116 is connected to the diaphragm valve 122 at one end and to the air discharging tubes 118 at a second end. Each of the air discharging tubes 118 extend through an air flow opening 80 in the dividing plate 74, as illustrated in FIGS. 3A and 3B, such that each air discharging tube 118 is positioned along the longitudinal axis and in the hollow center of one of the filter cartridges 16 when the filter cartridges 16 are positioned in the filter compartments 72. To effectively clean the filter cartridges 16, the air discharging tubes 118 are provided with a plurality of air discharging holes 126 so that air is effectively pulsed through the filter cartridges 16 along the entire length thereof.

As previously stated in reference to FIGS. 1 and 2, the blower 14 draws air through the capture arm 44 and the filter cartridges 16 then exhausts the filtered air through the outlet port 46. To aid in reducing the level of noise produced by the exhaustion of the filtered air, the outlet port 46 is disposed in the bottom panel 28 of the housing 12, as illustrated in FIG. 2. To further aid in reducing the noise level, a silencer box or muffler 128 (FIGS. 1 and 2) is positioned over the outlet port 46 and connected to the outlet of the blower 14 such that fluid communication is provided between the blower 14 and the outlet port 46 through the silencer box 128. The silencer box 128 is constructed of a galvanized steel or other suitable sound insulating material and is mounted to the bottom panel 28 of the housing 12 in a suitable manner, such as by a weld.

In FIG. 6, an exhaust grill 130 is shown attached below the housing 12. To evenly disperse the flow of air passing from the outlet port 46, the exhaust grill 130 is provided with a baffle plate 132 integrally formed therewith. The exhaust grill 130 is supported under the housing 12 such that the baffle plate 132 is positioned below the outlet port 46 in a spaced relationship. The spaced relationship between the outlet port 46 and the exhaust grill 130 is provided by securing the exhaust grill 130 to a pair of downwardly extending support angles 134 which are secured along opposite sides of the bottom panel 28 (FIG. 2). The support angles 134 and the exhaust grill 130 are fixed in place in any suitable manner, such as a weld. Also in FIG. 6, the caster wheels 24 are shown to be secured to a pair of caster support angles 136 which are in turn secured to the bottom panel 28 in a manner similar to that of the support angles 134 (FIG. 2).

Referring now to FIG. 7, another embodiment of an air cleaner assembly 10A is illustrated. FIG. 7 is an elevational view of the back side of the air cleaner assembly 10A with the back panel 30 partially cutaway for clarity. The air cleaner assembly 10A is substantially identical to the air cleaner assembly 10 in structure and operation, with the exceptions that will be noted. In the set shown in FIG. 7, a pair of flexible hoses 138, connectable to welding guns or other similar devices, are attached to the inlet port 42 in lieu of the adjustable capture arm assembly 44 shown in FIG. 1. It will be understood that either of the capture arm assembly 44 and the hoses 138 can be used with air cleaner assemblies 10 and 10A. In the air cleaner assembly 10A, a hose assembly 140 is employed within housing 12A as a conduit (in lieu of the airflow channel 82 of housing 12) for air flow communication between the filter compartment 72 and the blower 14. This arrangement permits some dimensional reductions as well as eliminating the sealing of the filter door 38.

To attach the flexible hoses 138 to the inlet port 42, an inlet plate 142 (best shown in FIG. 7A) having a pair of inlet tubes 144 is fastened across the inlet port 42. Each inlet tube 144 is adapted to have an end of a hose 138 connected thereto. If one of the inlet tubes 144 is not being used and only one hose 138 is connected to the air cleaner assembly 10, the unused inlet tube 144 can be blocked off with a plug (not shown).

The baffle assembly 20 of the air cleaner assembly 10A includes a dividing plate 74A which is provided with a pair of outlet tubes 146 and a pair of tube receiving ports 148 (one of each is shown). The outlet tubes 146 extend out from the dividing plate 74A so as to be connectable to the hose assembly 140. The hose assembly 140 includes a primary hose 150 attached to the inlet of the blower 14 and a pair of secondary hoses 152 attached to the primary hose 150 at one end and to one of the outlet tubes 146 at another end. By employing the hose assembly 140, a stronger vacuum can be created.

The tube receiving ports 148 are dimensioned to receive the air discharging tubes 118 of the backflushing assembly 22 and are disposed in the dividing plate 74A such that the tube receiving ports 148 are concentrically aligned with the filter openings 48 of the upper front panel 34 when the dividing plate 74A and the upper front panel 34 are each secured in position.

Operation

FIG. 8 depicts the air cleaner assemblies 10 and 10A in operation. In the operation of the air cleaner assemblies 10 and 10A, the blower 14 is activated with the switch 66 located on the end of the capture arm 44 or mounted on the housing 12. The blower 14 draws air (denoted as arrows 154) through the capture arm 44 or the hoses 138 (FIG. 7) into the filter compartments 72 where the air is directed through the channel 18. In the channel 18, the flow velocity of the air is decreased, permitting sufficient time for heavier particles to settle, or for hot particles (spark) to cool. The lower velocity air hits the center baffle 76 which changes the direction of the air flow. The sudden change in flow direction causes the heavier particles to separate and settle into the dust trays 52.

The baffle assembly 20 then directs the air into a vortical pattern around the filter cartridges 16 that causes the air to be effectively drawn through the filter cartridges 16 where the smaller particles are collected. The filtered air is then drawn down either the air flow channel 82 (FIG. 3B) or the hose assembly 140 (FIG. 9) and into the blower 14. The blower 14 exhausts the air into the silencer box 128 where it passes out the outlet port 46. The air exhausted from the outlet port 46 hits the baffle plate 132 which gently and quietly disperses the air through the exhaust grill 130.

The filter cartridges 16 are periodically cleaned with the backflushing assembly 22 which is operated with the blower 14 turned off. The diaphragm valve 122 is actuated with the pushbutton valve 123 and subsequently releases a blast of air from the accumulator 98. The blast of air is directed throughout the inside of each filter cartridge 16 via the plurality air discharging holes 126, thereby pulsing particles from the filter cartridges 16. The particles removed from the filter cartridges 16 settle into the dust trays 52 along with the particles collected therein during the filtering process. After cleaning the filter cartridges 16, the filtering process can be resumed without emptying the dust trays 52 because, as more clearly depicted in FIG. 8A, the flow directional lips 96 formed on the dust trays 52 direct the flow of air away from the interior of the dust trays 52 and leave the particles collected therein undisturbed.

From the above description it is clear that the present invention is well adapted to carry out the objects and to attain the ends and advantages mentioned herein as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed and as defined in the appended claims.

What is claimed:

1. An air cleaner assembly, comprising:
   a housing having an inlet port and an outlet port;
   filter means supported in the housing for filtering air passing therethrough;
   blower means for drawing air through the inlet port and the filter means and for exhausting the filtered air through the outlet port;
   channel means for decreasing the flow velocity of the air entering the inlet port;
   baffle means for directing the flow of air from the channel means in a vortical pattern about the filter means to separate particles from the flow of air and to direct the separated particles away from the filter means;
   tray means positioned below the filter means for collecting the particles separated from the flow of air; and
   means for directing the flow of air away from the interior of the tray means so that the particles collected therein are undisturbed by the flow of air.

2. The air cleaner assembly of claim 1 wherein the means for directing the flow of air comprises a pair of oppositely disposed inwardly angled flow directional lips integrally formed on the tray means extending along the length thereof.

3. The air cleaner assembly of claim 2 wherein the housing and baffle means define a filter compartment, the filter means comprises a filter cartridge supported in the filter compartment, and the air cleaner assembly further comprises:

conduit means connecting the filter compartment and the blower means for providing air flow communication therebetween.

4. The air cleaner assembly of claim 3 wherein the conduit means comprises a hose assembly.

5. The air cleaner assembly of claim 3 wherein the outlet port is disposed on the bottom side of the housing.

6. The air cleaner assembly of claim 5 wherein the housing further comprises:

muffler means, positioned over the outlet port and connected to the blower means, for reducing the level of noise produced by the exhaustion of air.

7. The air cleaner assembly of claim 6 further comprising:

a baffle plate positioned beneath the outlet port to disperse the flow of air therefrom.

8. The air cleaner assembly of claim 7 wherein the baffle plate is integrally formed with an exhaust grill.

9. The air cleaner assembly of claim 3 further comprising:

backflushing means for discharging a blast of air through the filter to remove the particles collected thereon.

10. The air cleaner assembly of claim 9 wherein the filter cartridge has a central hollow along its longitudinal axis, and wherein the backflushing means comprises:

accumulator means for accumulating a supply of air;
a blow pipe having a first end connected to the accumulator means and a second end positioned to extend into the filter cartridge along the longitudinal axis thereof, the second end having a plurality of air discharging holes; and
accumulator valve means for controlling the discharge of air from the accumulator means to the blow pipe.

11. An air cleaner assembly for capturing and filtering gaseous fumes at the source thereof, comprising:

a housing having an inlet port and an outlet port;
filter means supported in the housing for filtering fumes passing therethrough;
fume conduit means for transporting fumes from their source into the housing via the inlet port;
blower means for drawing fumes through the conduit means and the filter means and for exhausting the filtered fumes through the outlet port;
channel means for decreasing the flow velocity of the fumes drawn into the housing;
baffle means for directing the fumes in a vortical pattern about the filter means to separate particles from the fumes and to direct the separated particles away from the filter means;
tray means positioned below the filter means for collecting the particles separated from the fumes; and
means for directing the flow of fumes away from the interior of the tray means so that the particles collected therein are undisturbed by the flow of fumes.

12. The air cleaner assembly of claim 11 wherein the fume conduit means comprises:

flexible hose means connected to the inlet port of the housing.

13. The air cleaner assembly of claim 11 wherein the fume conduit means comprises:

capture arm assembly means pivotally connected to the inlet port of the housing for directing fumes from the fume source to the inlet port; and
gas spring means connected to and extending between the housing and the capture arm assembly means for supporting the capture arm assembly in a selected angular disposition to the housing.

14. The air cleaner assembly of claim 11 wherein the means for directing the flow of fumes comprises a pair of oppositely disposed inwardly angled flow directional lips integrally formed on the tray means extending along the length thereof.

15. An air cleaner assembly for capturing and filtering gaseous fumes at the source thereof, comprising:

a housing having an inlet port and an outlet port;
a filter cartridge for filtering fumes passing through the housing;
fume conduit means for transporting fumes from their source into the housing via the inlet port;
blower means for drawing fumes through the fume conduit means and the filter cartridge and for exhausting the filtered fumes through the outlet port;
channel means for decreasing the flow velocity of the fumes drawn into the housing;
baffle means for directing the fumes in a vortical pattern about the filter cartridge to separate particles from the fumes and to direct the separated particles away from the filter cartridge, the baffle means and the housing cooperating to define a filter compartment adapted to supportingly receive the filter cartridge; and
conduit means connecting the filter compartment and the blower means for providing air flow communication therebetween.

16. The air cleaner assembly of claim 15 wherein the outlet port is disposed on the bottom side of the housing.

17. The air cleaner assembly of claim 16 wherein the housing further comprises:

muffler means, positioned over the outlet port and connected to the blower means, for reducing the level of noise produced by the exhaustion of the filtered fumes.

18. The air cleaner assembly of claim 17 further comprising:

a baffle plate positioned beneath the outlet port to disperse the flow of filtered fumes.

19. The air cleaner assembly of claim 18 wherein the baffle plate is integrally formed with an exhaust grill.

20. The air cleaner assembly of claim 15 further comprising:

backflushing means for discharging a blast of air through the filter cartridge to remove the particles collected thereon.

21. The air cleaner assembly of claim 20 wherein the filter cartridge has a central hollow along its longitudinal axis, and wherein the backflushing means comprises:

accumulator means for accumulating a supply of air;
a blow pipe having a first end connected to the accumulator and a second end positioned to extend into the filter cartridge along the longitudinal axis thereof, the second end having a plurality of air discharging holes; and accumulator valve means for controlling the discharge of air from the accumulator means to the blow pipe.

22. A portable air cleaner assembly for capturing and filtering gaseous fumes at their source, the air cleaner assembly comprising:

a housing havinga n inlet port and an outlet port and supported on a plurality of supporting wheels, the housing having a pair of filter compartments;

a pair of filter cartridges horizontally disposed in the filter compartments in a spaced apart, parallel relationship;

blower means for drawing fumes into the housing via the inlet port and through the filter cartridges and for exhausting the fumes through the outlet port, the blower means comprising a blower having a suction port in fume communication with the filter compartments;

channel means for decreasing the flow velocity of the fumes drawn into the housing, the channel means comprising a pair of intake baffles positioned below the inlet port and configured to define a Y-shaped channel;

baffle means for directing the flow of fumes in a vortical pattern about the filter cartridges to separate particles from the fumes and directing the separated particles away from the filter cartridges; and dust collection means positioned below filter cartridges for collecting the separated particles, the dust collection means comprising a pair of dust trays, each dust tray having a pair of oppositely disposed inwardly angled flow directional lips along the length of the dust tray to prevent the particles collected therein from being disturbed.

23. The air cleaner assembly of claim 22 further comprising:

backflushing means for discharging blasts of air through the filter cartridges to remove the particles collected thereon, the backflushing means comprising:

accumulator means for accumulating a supply of air;

a pair of blow pipes, each such blow pipe having a first end connected to the accumulator means and a second end positioned to extend into one of the filter cartridges along the longitudinal axis thereof, the second end having a plurality of air discharging holes; and accumulator valve means for controlling the discharge of air from the accumulator means to the blow pipes.

24. The air cleaner assembly of claim 23 further comprising:

conduit means for transporting fumes from their source into the housing via the inlet port.

* * * * *

UNITED STATES PATENT AND TRADEMARK OFFICE
CERTIFICATE OF CORRECTION

PATENT NO. : 5,281,246
DATED : January 25, 1994
INVENTOR(S) : Shaun Ray and Robert G. Nelson It is certified that error appears in the above-indentified patent and that said Letters Patent is hereby corrected as shown below:

Column 11, line 8, delete "havinga n" and substitute therefor --having an--.

Signed and Sealed this

Eleventh Day of October, 1994

*Attest:*

BRUCE LEHMAN

*Attesting Officer*     *Commissioner of Patents and Trademarks*